(12) United States Patent
Rosen et al.

(10) Patent No.: US 9,651,194 B1
(45) Date of Patent: May 16, 2017

(54) CABIN AIR COMPRESSOR BRACKET

(71) Applicant: HAMILTON SUNDSTRAND CORPORATION, Windsor Locks, CT (US)

(72) Inventors: Seth E. Rosen, Middletown, CT (US); Christopher Tokas, Springfield, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 14/948,818

(22) Filed: Nov. 23, 2015

(51) Int. Cl.
| | |
|---|---|
| *A47F 5/00* | (2006.01) |
| *F16M 13/02* | (2006.01) |
| *B64D 13/02* | (2006.01) |
| *B64D 13/08* | (2006.01) |
| *B64D 13/06* | (2006.01) |

(52) U.S. Cl.
CPC .............. *F16M 13/02* (2013.01); *B64D 13/02* (2013.01); *B64D 13/08* (2013.01); *B64D 2013/0603* (2013.01)

(58) Field of Classification Search
CPC ....... F04D 29/601; F04D 29/60; B64D 13/02; B64D 13/00; F16M 13/02
See application file for complete search history.

(56) References Cited

U.S. PATENT DOCUMENTS

| | | | |
|---|---|---|---|
| 7,810,466 B2 * | 10/2010 | Preimesberger | F02B 67/10 123/184.31 |
| 9,175,696 B2 * | 11/2015 | Vignali | F04D 17/10 |
| 2014/0346315 A1 * | 11/2014 | Mayo | B60H 1/00535 248/674 |
| 2014/0367543 A1 * | 12/2014 | Mayo | F16L 3/00 248/309.1 |

\* cited by examiner

*Primary Examiner* — Amy Sterling
(74) *Attorney, Agent, or Firm* — Cantor Colburn LLP

(57) ABSTRACT

A support bracket has a support portion, a first mounting portion, and a second mounting portion. The first mounting portion extends from a first end of the support portion. The second mounting portion extends from a second end of the support portion. The second mounting portion defines a coupling hole that is disposed proximate an end surface of the second mounting portion. A first support rib engages a first surface of the support portion and a third surface of the first mounting portion.

19 Claims, 2 Drawing Sheets

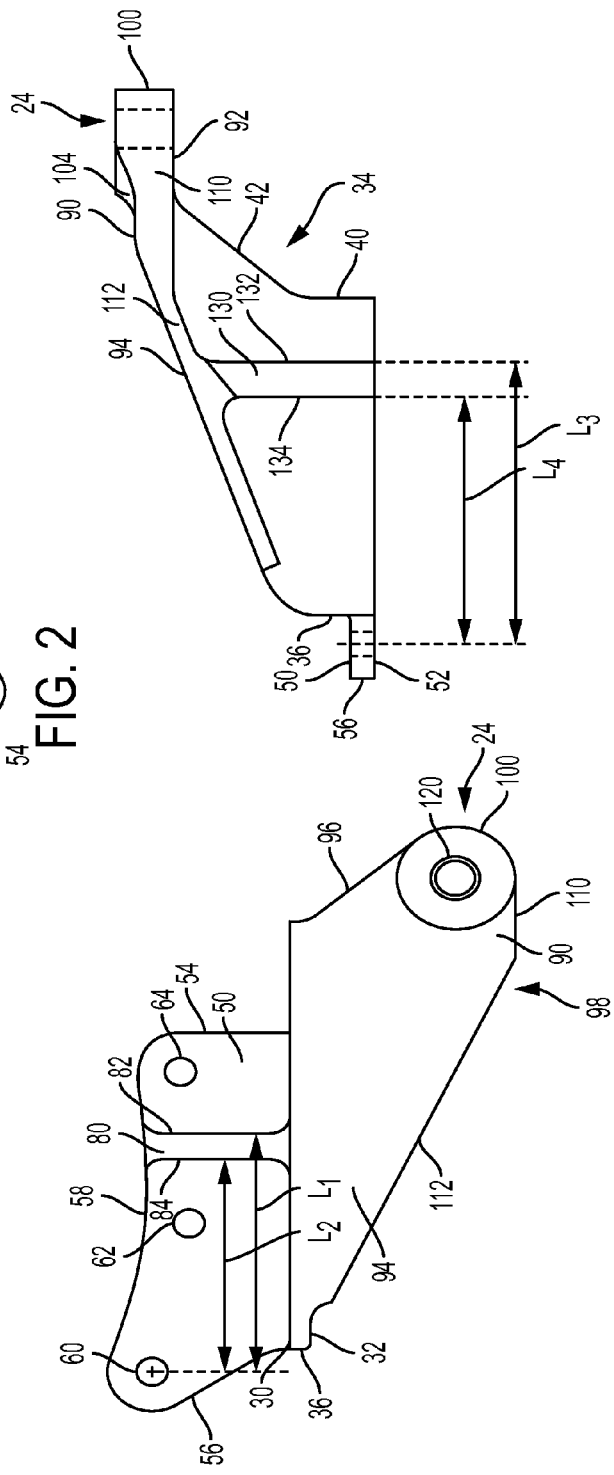
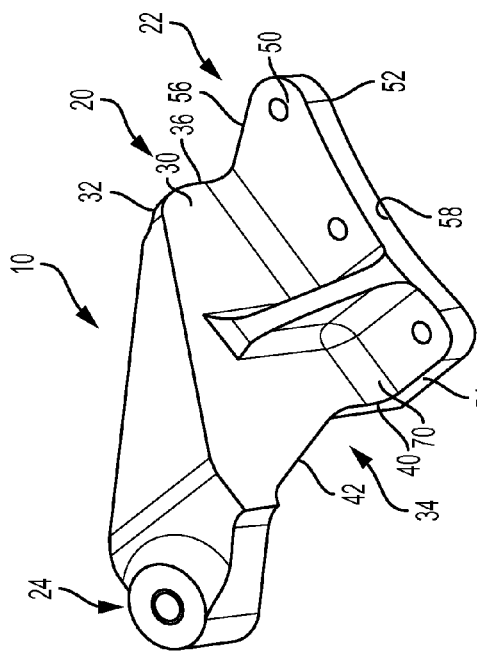

CABIN AIR COMPRESSOR BRACKET

BACKGROUND

The present disclosure relates to a cabin air compressor bracket for an aircraft environmental control system.

Environmental control systems (ECSs) are utilized on various types of aircraft for several purposes, such as in cooling systems for the aircraft. A cabin air conditioning and temperature control system (CACTCS) is an example of an aircraft ECS that includes air cycle packs supplied with pressurized outside (fresh) air from electric motor-driven cabin air compressors (CACs) which condition fresh air for cabin heating and cooling. The CACTCS provides flow control for modulation of cooling pack air flow, recirculation fans to circulate cabin air, and associated valves and sensors used for system control.

The CACTCS may also include a trim air system to provide individual cabin zone temperature control. This includes trim temperature control valves, trim duct heaters and associated sensors. As one example, a CACTCS may provide control of six baseline passenger zones and a flight deck zone. Additional zones, such as a forward cargo zone, a crew zone and/or an attendant zone may be controlled by other ECSs. Recirculation fans may also be provided for additional air flow to the passenger cabin and to ensure that flow at an air distribution nozzle remains constant.

SUMMARY

These and other advantages and features will become more apparent from the following description taken in conjunction with the drawings.

In a first embodiment of the present disclosure, a support bracket having a support portion, a first mounting portion, a second mounting portion, and a first support rib. The support portion has a first surface disposed opposite a second surface and a first side disposed opposite a second side. The first mounting portion extends from a first end of the support portion. The first mounting portion has a third surface disposed opposite a fourth surface and a third side disposed opposite a fourth side. The first mounting portion defines a mounting hole that extends from the third surface to the fourth surface. The second mounting portion extends from a second end of the support portion. The second mounting portion has a fifth surface disposed opposite a sixth surface and a fifth side disposed opposite a sixth side. The second mounting portion defines a coupling hole that extends from the fifth surface to the sixth surface and is disposed proximate an end surface of the second mounting portion. The end surface extends beyond the first side and the third side. The first support rib engages the first surface and the third surface.

In a second embodiment of the present disclosure, a support bracket having a support portion, a first mounting portion, a second mounting portion, a first support rib, and a second support rib is provided. The support portion has a first surface disposed opposite a second surface. The first mounting portion extends from a first end of the support portion. The first mounting portion has a third surface disposed opposite a fourth surface. The first mounting portion defines a mounting hole that extends from the third surface to the fourth surface. A first transition region is formed between the first surface and the third surface. The second mounting portion extends from a second end of the support portion. The second mounting portion has a fifth surface disposed opposite a sixth surface. The second mounting portion defines a coupling hole that extends from the fifth surface to the sixth surface and is disposed proximate an end surface of the second mounting portion. The coupling hole is disposed opposite the mounting hole. The first support rib engages the first surface, the first transition region, and the third surface. The second support rib engages the second surface and the sixth surface.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 2 is an isometric view of the support bracket;

FIG. 3 is a top view of the support bracket; and

FIG. 4 is a rear view of the support bracket.

DETAILED DESCRIPTION

Figure 1:
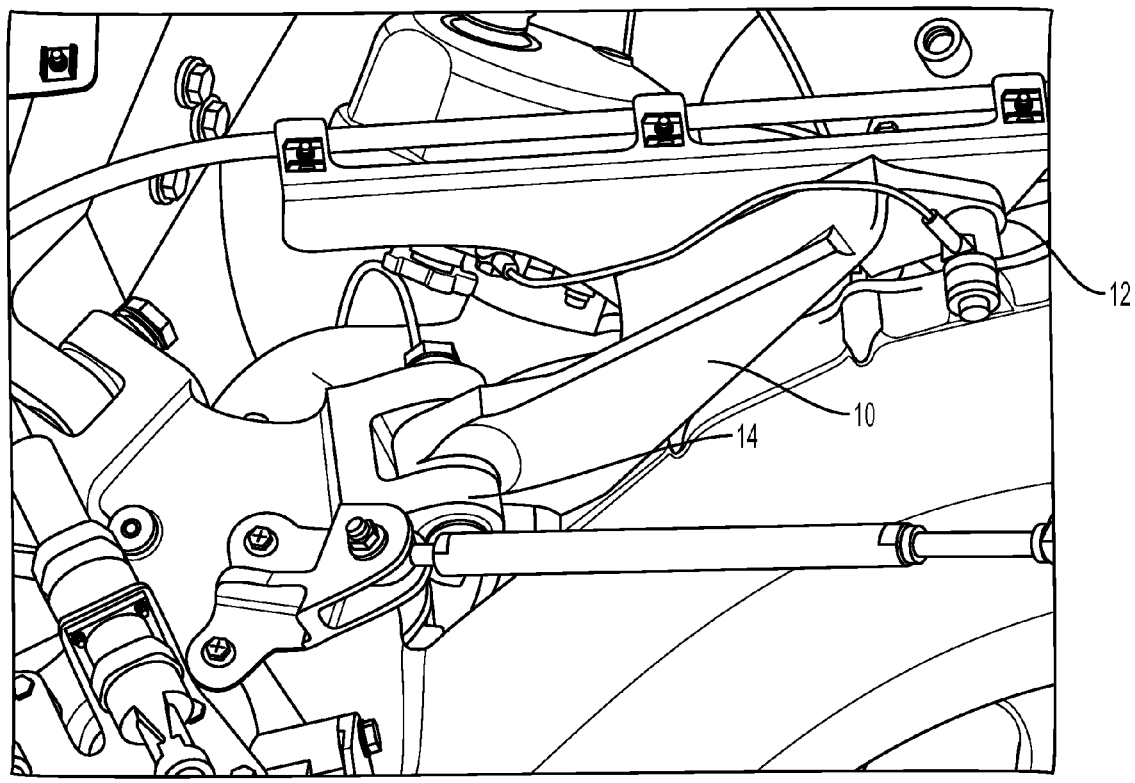
FIG. 1 is a perspective view of a support bracket assembled with a CACTCS.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, an support bracket 10 is shown. The support bracket 10 may be provided with an aircraft environmental control system such as a cabin air conditioning and temperature control system. The support bracket 10 is configured to interconnect a cabin air compressor 12 and a mount 14 (upper or lower three-way mount) coupled to a vibration isolator.

Referring to FIG. 2-4 the support bracket 10 includes a support portion 20, a first mounting portion 22, and a second mounting portion 24. The support portion 20 provides a structural support for the first mounting portion 22 and the second mounting portion 24. The support portion 20 is a generally planar member having a first surface 30, a second surface 32, a first side 34, and a second side 36.

The first surface 30 is a generally planar surface. The first surface 30 faces towards a cabin air compressor of the cabin air conditioning temperature control system. The second surface 32 is disposed opposite the first surface 30. The second surface 32 is a generally planar surface that is disposed substantially parallel to the first surface 30. The second surface 32 faces towards the mount. A thickness of the support portion 20 defined between the first surface 30 and the second surface 32 is within the range of 0.230 inches to 0.270 inches.

The first side 34 includes a first portion 40 and a second portion 42. The first portion 40 is disposed substantially parallel to the second side 36. The second portion 42 extends from the first portion 40. The second portion 42 and the first portion 40 extend at an angle with respect to each other. The angle is an obtuse angle and is configured such that the second portion 42 extends generally upward or away from the first end of the support portion towards the second end of the support portion such that the second portion 42 is disposed in a substantially nonparallel relationship with the second side 36.

The second side 36 extends between the first surface 30 and the second surface 32. The second side 36 extends from a first end of the support portion 20 to a second end of the support portion 20. The second side 36 is disposed opposite the first side 34.

The first mounting portion 22 is configured to engage the cabin air compressor of the cabin air conditioning temperature control system. The first mounting portion 22 extends from the first end of the support portion 20 in a first direction. The first mounting portion 22 is a generally planar member having a third surface 50, a fourth surface 52, a third side 54, a fourth side 56, and an arcuate side 58.

The third surface 50 is a generally planar surface. The third surface 50 faces towards the cabin air compressor of the cabin air conditioning temperature control system. The fourth surface 52 is disposed opposite the third surface 50. The fourth surface 52 is a generally planar surface that is disposed substantially parallel to the third surface 50. The fourth surface 52 faces away from the cabin air compressor of the cabin air conditioning temperature control system. A thickness of the first mounting portion 22 defined between the third surface 50 and the fourth surface 52 is within the range of 0.335 inches to 0.375 inches.

The third side 54 extends between the third surface 50 and the fourth surface 52. The third side 54 extends from the first end of the support portion 20 towards the arcuate side 58. The fourth side 56 is disposed opposite the third side 54. The fourth side 56 extends between the third surface 50 and the fourth surface 52. The fourth side 56 extends from the first end of the support portion 20 towards the arcuate side 58. The fourth side 56 is disposed in a nonparallel relationship with the third side 54. The fourth side 56 extends or angles away from the third side 54 in a direction that extends away from the first end of the support portion 20 towards the arcuate side 58. The arcuate side 58 extends between the third surface 50 and the fourth surface 52. The arcuate side 58 extends from the third side 54 to the fourth side 56. The arcuate side 58 may have a substantially constant radius of curvature. For example, the arcuate side 58 may have a radius of curvature of 7.815 inches.

The first mounting portion 22 defines a first mounting hole 60, a second mounting hole 62, and a third mounting hole 64. The first mounting hole 60 is disposed proximate the fourth side 56 and the arcuate side 58. The first mounting hole 60 extends from the third surface 50 to the fourth surface 52. The second mounting hole 62 is disposed proximate the arcuate side 58 and is spaced apart from and disposed between the first mounting hole 60 and the third mounting hole 64. The second mounting hole 62 extends from the third surface 50 to the fourth surface 52. The third mounting hole 64 is disposed proximate the third side 54 and the arcuate side 58. The third mounting hole 64 extends from the third surface 50 to the fourth surface 52. The first mounting hole 60, the second mounting hole 62, and the third mounting hole 64 have a generally arc-like configuration that extends along a mounting hole arc. The first mounting hole 60, the second mounting hole 62, and the third mounting hole 64 are disposed closer to the arcuate side 58 than the first end/first surface of the support portion 20.

A first transition region 70 is formed between the first surface 30 of the support portion 20 and the third surface 50 of the first mounting portion 22. The first transition region 70 provides a smooth transition between the support portion 20 and the first mounting portion 22.

A first support rib 80 extends between the support portion 20 and the first mounting portion 22. The first support rib 80 extends between the arcuate side 58 and the first end of the support portion 20. The first support rib 80 is spaced apart from the second mounting portion 24. The first support rib 80 is disposed between the second mounting hole 62 and the third mounting hole 64. The first support rib 80 is a structural rib that engages the first surface 30 of the support portion 20, the third surface 50 of the first mounting portion 22, and the first transition region 70.

The first support rib 80 has a first side surface 82 and a second side surface 84 disposed opposite the first side surface 82. A first linear distance, L1, between the center of the first mounting hole 60 and the first side surface 82 of the first support rib 80 is within the range of 3.410 inches and 3.430 inches. A second linear distance, L2, between a center of the first mounting hole 60 and the second side surface 84 of the first support rib 80 is within the range of 3.055 inches and 3.075 inches. A ratio between the first linear distance, L1, and the second linear distance, L2, has a minimum ratio of 3.075/3.44 and a maximum ratio of 3.055/3.41. The ratios determine a thickness of the first support rib 80.

The second mounting portion 24 is configured to engage the mount. The second mounting portion 24 extends from the second end of the support portion 20 in a second direction opposite the first direction such that the support bracket 10 has a generally z-shaped configuration. The second mounting portion 24 has a fifth surface 90, a sixth surface 92, a ramped surface 94, a fifth side 96, a sixth side 98, an end surface 100.

The fifth surface 90 is disposed opposite the sixth surface 92. A thickness of the second mounting portion 24 defined between the fifth surface 90 and the sixth surface 92 is approximately 0.815 inches. A height of the support bracket 10 defined between the third surface 50 and the fifth surface 90 is approximately 3.351 inches. The fifth surface 90 is disposed substantially parallel to but not coplanar with the third surface 50 of the first mounting portion 22.

The ramped surface 94 extends between the first surface 30 of the support portion 20 to the fifth surface 90 of the second mounting portion 24. The ramped surface 94 provides a transition between the support portion 20 and the second mounting portion 24. A second transition region 104 is formed between the fifth surface 90 and the ramped surface 94, such that the ramped surface 94 extends from the first surface 30 of the support portion 20 towards the second transition region 104.

The fifth side 96 extends between the fifth surface 90, the sixth surface 92, and the ramped surface 94. The fifth side 96 is disposed opposite the sixth side 98.

The sixth side 98 extends between the fifth surface 90, the sixth surface 92, and the ramped surface 94. The sixth side 98 includes a first segment 110 and a second segment 112. The first segment 110 and the second segment 112 extend at an angle with respect to each other. The angle is a generally obtuse angle such that the first segment 110 and the second segment 112 are disposed in a substantially nonparallel relationship with the fifth side 96. The fifth side 96 and the first segment 110 of the sixth side 98 are disposed at an angle with respect to each other such that the fifth side 96 and the first segment 110 of the sixth side 98 become progressively closer to each other in a direction that extends towards the end surface 100.

The end surface 100 is disposed opposite the second side 36 of the support portion 20. The end surface 100 is disposed opposite the fourth side 56 and the arcuate side 58 of the first mounting portion 22. The end surface 100 extends beyond the first side 34 of the support portion 20 and the third side 54 of the first mounting portion 22.

The second mounting portion 24 defines a coupling hole 120. The coupling hole 120 is disposed proximate the end surface 100. More specifically, the coupling hole 120 is disposed between the fifth side 96, the sixth side 98, and the end surface 100 and extends from the fifth surface 90 to the sixth surface 92. The coupling hole 120 is disposed opposite the first mounting hole 60. A linear distance between a center of the first mounting hole 60 and a center of the coupling hole 120 is approximately 7.112 inches.

A second support rib 130 extends between the support portion 20 and the second mounting portion 24. The second support rib 130 is spaced apart from the first mounting portion 22. The second support rib 130 is a structural rib that engages the second surface 32 of the support portion 20 and the sixth surface 92 of the second mounting portion 24. The second support rib 130 has a first side surface 132 and a second side surface 134 disposed opposite the first side surface 132. A third linear distance, L3, between the center of the first mounting hole 60 and the first side surface 132 of the second support rib 130 is within the range of 3.960 inches and 3.980 inches. A fourth linear distance, L4, between a center of the first mounting hole 60 and the second side surface 134 of the second support rib 130 is within the range of 3.460 inches and 3.480 inches. A ratio between the third linear distance, L3, and the fourth linear distance, L4, has a minimum ratio of 3.48/3.96 and a maximum ratio of 3.46/3.98. The ratios determine a thickness of the second support rib 130.

While embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A support bracket comprising:
   a support portion having a first surface disposed opposite a second surface and a first side disposed opposite a second side;
   a first mounting portion extending from a first end of the support portion, the first mounting portion having a third surface disposed opposite a fourth surface and a third side disposed opposite a fourth side, the first mounting portion defining a first mounting hole, a second mounting hole, and a third mounting hole, the first mounting hole being disposed proximate the fourth side, the third mounting hole being disposed proximate the third side, and the second mounting hole being disposed between the first mounting hole and the third mounting hole;
   a second mounting portion extending from a second end of the support portion, the second mounting portion having a fifth surface disposed opposite a sixth surface and a fifth side disposed opposite a sixth side, the second mounting portion defining a coupling hole that extends from the fifth surface to the sixth surface and is disposed proximate an end surface of the second mounting portion, the end surface extending beyond the first side and the third side; and
   a first support rib that engages the first surface and the third surface and is disposed between the second mounting hole and the third mounting hole.

2. The support bracket of claim 1, wherein a first linear distance between a center of the mounting hole and a first side surface of the first support rib is between 3.410 and 3.430.

3. The support bracket of claim 2, wherein a second linear distance between the center of the mounting hole and a second side surface of the first support rib is between 3.055 and 3.075.

4. The support bracket of claim 1, further comprising a second support rib that engages the second surface and the sixth surface.

5. The support bracket of claim 4, wherein a third linear distance between a center of the mounting hole and a first side surface of the second support rib is between 3.960 and 3.980.

6. The support bracket of claim 5, wherein a fourth linear distance between the center of the mounting hole and a second side surface of the second support rib is between 3.460 and 3.480.

7. The support bracket of claim 1, wherein a linear distance between a center of the mounting hole and a center of the coupling hole is approximately 7.112.

8. The support bracket of claim 1, wherein the first mounting portion is configured to be coupled to a cabin air compressor.

9. The support bracket of claim 1, wherein the second mounting portion is configured to be coupled to a mount.

10. A support bracket comprising:
    a support portion having a first surface disposed opposite a second surface;
    a first mounting portion extending from a first end of the support portion, the first mounting portion having a third surface disposed opposite a fourth surface, the first mounting portion defining a first mounting hole disposed proximate the fourth surface, a second mounting hole spaced apart from the first mounting hole, and a third mounting hole disposed proximate the third surface;
    a second mounting portion extending from a second end of the support portion, the second mounting portion having a fifth surface disposed opposite a sixth surface, the second mounting portion defining a coupling hole that extends from the fifth surface to the sixth surface and is disposed proximate an end surface of the second mounting portion, wherein the coupling hole is disposed opposite the mounting hole;
    a first support rib that engages the first surface, the first transition region, and the third surface and is disposed between the second mounting hole and the third mounting hole; and
    a second support rib that engages the second surface and the sixth surface and is proximately aligned with the third mounting hole.

11. The support bracket of claim 10, wherein the end surface of the second mounting portion is disposed opposite a second side of the first mounting portion.

12. The support bracket of claim 11, wherein the end surface of the second mounting portion extends beyond a first side of the support portion and a third side of the first mounting portion.

13. The support bracket of claim 10, wherein the first mounting portion defines a second mounting hole spaced apart from the mounting hole that extends from the third surface to the fourth surface.

14. The support bracket of claim 13, wherein a ratio between a first linear distance from a center of the mounting hole to a first side surface of the first support rib and a second linear distance from the center of the mounting hole to a second side surface of the first support rib is within a range of 3.075/3.43 and 3.055/3.44.

15. The support bracket of claim 13, wherein a ratio between a third linear distance from a center of the mounting hole to a first side surface of the second support rib and a fourth linear distance from the center of the mounting hole to a second side surface of the second support rib is within a range of 3.48/3.96 and 3.46/3.98.

16. The support bracket of claim 10, wherein the third surface is disposed substantially parallel to but not coplanar with the fifth surface.

17. The support bracket of claim 10, wherein the first mounting portion is configured to be coupled to a cabin air compressor.

18. The support bracket of claim 10, wherein the second mounting portion is configured to be coupled to a mount.

19. The support bracket of claim 10, wherein the second mounting portion includes a ramped surface that extends from the first surface towards a second transition region that extends between the coupling hole and the fifth surface.

* * * * *